US012221903B2

(12) United States Patent
Conlon

(10) Patent No.: US 12,221,903 B2
(45) Date of Patent: Feb. 11, 2025

(54) HYDROGEN FUELED ELECTRIC POWER PLANT WITH THERMAL ENERGY STORAGE

(71) Applicant: PINTAIL POWER LLC, Palo Alto, CA (US)

(72) Inventor: William M. Conlon, Palo Alto, CA (US)

(73) Assignee: PINTAIL POWER LLC, Palo Alto, CA (US)

( * ) Notice: Subject to any disclaimer, the term of this patent is extended or adjusted under 35 U.S.C. 154(b) by 0 days.

(21) Appl. No.: 18/230,914

(22) Filed: Aug. 7, 2023

(65) Prior Publication Data

US 2024/0159166 A1 May 16, 2024

Related U.S. Application Data

(63) Continuation-in-part of application No. PCT/US2022/015417, filed on Feb. 7, 2022.

(Continued)

(51) Int. Cl.
*F01K 1/10* (2006.01)
*F01K 3/18* (2006.01)
*F01K 15/00* (2006.01)

(52) U.S. Cl.
CPC ............... *F01K 1/10* (2013.01); *F01K 3/186* (2013.01); *F01K 15/00* (2013.01)

(58) Field of Classification Search
CPC ........... F05D 2220/40; F05D 2240/128; F05D 2260/38; F05D 2260/60; F02B 37/24;
(Continued)

(56) References Cited

U.S. PATENT DOCUMENTS 7,491,309 B2 * 2/2009 Peter .................. C25B 1/02
204/266
8,203,225 B2 6/2012 Devine
(Continued)

FOREIGN PATENT DOCUMENTS

DE 102012214907 B4 5/2015
JP H1172028 A 3/1999

OTHER PUBLICATIONS

From the USPTO as the ISA, Notification of Transmittal of the International Search Report and the Written Opinion of the International Searching Authority, or the Declaration, PCT/US2022/015417, May 11, 2022, 9 pages.
(Continued)

*Primary Examiner* — Jesse S Bogue
(74) *Attorney, Agent, or Firm* — Schmidt Patent Law, Inc.

(57) ABSTRACT

The invention relates generally to methods and apparatus for operation of hydrogen fueled electric power plants integrated with thermal energy storage. It is an object of this invention to reduce the cost of providing reliable electricity from variable renewable energy sources by storing excess renewable energy and using the stored renewable energy to reduce the quantity of fuel required, to reduce the cost of producing hydrogen fuel by electrolysis, and to produce and store hydrogen at the power plant to eliminate the cost of transporting hydrogen and the need to upgrade natural gas pipelines and pipeline compressors.

20 Claims, 6 Drawing Sheets

Related U.S. Application Data

(60) Provisional application No. 63/147,044, filed on Feb. 8, 2021.

(58) Field of Classification Search
CPC .......... F01D 17/16; F01D 17/165; F01D 9/04; F01K 1/10; F01K 15/00; F01K 23/10; F01K 23/18; F01K 3/186; F02C 3/22; F02C 6/14; F02C 6/18; F28D 2020/0047; Y02E 20/16

See application file for complete search history.

(56) References Cited

U.S. PATENT DOCUMENTS

| | | | |
|---|---|---|---|
| 8,286,431 B2* | 10/2012 | Briesch | F01K 23/10 60/39.182 |
| 9,885,257 B2* | 2/2018 | Bergins | C25B 1/02 |
| 11,181,041 B2* | 11/2021 | Smith | F22B 1/28 |
| 11,670,960 B2 | 6/2023 | Hunt et al. | |
| 11,753,993 B1* | 9/2023 | Terwilliger | F02C 3/22 60/266 |
| 11,867,092 B2* | 1/2024 | Broy | C25B 15/08 |
| 2006/0204801 A1* | 9/2006 | Sandaker | H01M 8/04932 429/492 |
| 2008/0047502 A1 | 2/2008 | Morse | |
| 2008/0163618 A1* | 7/2008 | Paul | F03D 9/17 60/407 |
| 2012/0102950 A1 | 5/2012 | Turchi | |
| 2013/0147197 A1 | 6/2013 | Goebel et al. | |
| 2014/0203557 A1* | 7/2014 | Kim | F01K 23/101 60/39.12 |
| 2015/0329979 A1 | 11/2015 | Reytier et al. | |
| 2016/0017800 A1* | 1/2016 | Simpson | C25B 1/04 422/162 |
| 2018/0245485 A1 | 8/2018 | Conlon | |
| 2019/0226462 A1* | 7/2019 | Conlon | F01K 7/16 |
| 2019/0264582 A1* | 8/2019 | Hinders | F01K 23/10 |

OTHER PUBLICATIONS

Machine Translation, DE102012214907B4, May 21, 2015, Siemens AG, 17 pages.

The extended European search report, EP22750513.8, Dec. 16, 2024, 9 pages.

* cited by examiner

| | Simple Cycle | | | | Liquid Salt Combined Cycle | | | | |
|---|---|---|---|---|---|---|---|---|---|
| Combustion Turbine | Power (kW) | Heat Rate (Btu/kWh) | Exh. Temp (°C) | Steam (bar/°C) | Net Power (kW) | Fuel Heat Rate (Btu/kWh) | Primary Energy Rate (kWh/kWh) | Steam Flow (kg/s-MW) | Salt Flow (kg/kWh) |
| GE 7FA.04 | 195,237 | 8827 | 607 | 80/550 | 383,890 | 4489 | 0.61 | 0.87 | 12.8 |
| Siemens SGT-800 | 56,523 | 8568 | 566 | 70/525 | 105,859 | 4575 | .70 | .874 | 11.9 |
| GE LM6000 | 49,955 | 8513 | 450 | 40/425 | 91,949 | 4625 | 0.92 | 1.05 | 12.5 |

Figure 5

HYDROGEN FUELED ELECTRIC POWER PLANT WITH THERMAL ENERGY STORAGE

CROSS REFERENCE TO RELATED APPLICATIONS

This application is a continuation-in-part of International Patent Application No. PCT/US2022/015417 filed Feb. 7, 2022, which claims benefit of priority to U.S. Patent Application No. 63/147,044 filed Feb. 8, 2021, each of which is incorporated herein by reference in its entirety.

FIELD OF THE INVENTION

The invention relates generally to methods and apparatus for operation of hydrogen fueled electric power plants integrated with thermal energy storage.

BACKGROUND

Renewable resources are so abundant in some places that after displacing fossil fuel generation, the renewables must also be curtailed. For example, on Apr. 21, 2019, before COVID related load reductions, the California Independent System Operator (CAISO) curtailed almost 32 GWh of solar energy because generation exceeded demand. For both economic and environmental reasons, it is essential to store this otherwise curtailed energy for use when the natural variability of renewable resources demands backup from dispatchable generation. Each day, as solar production begins, the CAISO grid experiences a large and rapid drop in net load that forces combined cycle plants off-line. And as solar production wanes in the late afternoon, these plants must rapidly come back on-line. These two related grid operational issues—over-generation and renewable curtailment, and steep ramps in the load served by CAISO are phenomena that create the now famous "Duck Curve" shown in FIG. 1.

National, regional and local governments throughout the world have established laws, mandates, and targets for still larger amounts of renewable energy. For example, in 2018, California enacted SB-100, which mandates that 60% of retail electricity (i.e., electricity delivered to customers) is from renewable resources, which was defined to exclude large hydro and nuclear power. As VRE increases, the "neck" of the Duck gets steeper and the "belly" of the Duck gets deeper so that the base load is eliminated, as illustrated in FIG. 2 for a 50% renewable portfolio. Under such a scenario, power plants would not operate to serve base load, but would be dispatched as a complement to renewable generation. The excess renewable generation and electricity from less flexible plants would also be stored and time-shifted.

The renewable resources are preferentially dispatched because they have very low (often zero) marginal cost, which places them first in the economic merit order. In contrast, conventional power generation has variable costs per MWh for fuel and O&M (operations and maintenance). The cost-duration curve of FIG. 3 shows that an electric power market with moderate quantities of wind and solar VRE will have four distinct economic opportunities for power plants: A, High value peaking power for several hundred hours per year; B, Moderate value plateau for about five thousand hours per year; C, Ramping need for about one thousand hours per year; D, Zero marginal cost for about two thousand hours per year.

There is a further need to reduce Greenhouse Gas (GHG) emissions by storing excess renewable generation for use when renewable energy is not available, reducing the amount of fuel consumed by dispatchable power systems used to back up the variable renewable energy, producing renewable fuels by capturing and recycling GHGs, capturing and sequestering GHG emissions, or by using hydrogen fuel to eliminate GHG emissions.

Hydrogen is commonly produced from natural gas using a steam-methane reforming process which produces carbon dioxide as a byproduct that could be captured and sequestered. Alternatively, hydrogen could be produced by using excess renewable or nuclear power to split water by electrolysis into its constituents without GHG emissions. Hydrogen, whether produced from natural gas or by electrolysis of water is several times more expensive than natural gas, so its use as a fuel in conventional thermal power plants would increase the cost of electricity.

SUMMARY

It is an object of this invention to reduce the cost of providing reliable electricity from variable renewable energy sources by storing excess renewable energy and using the stored renewable energy to reduce the quantity of fuel required. A second object of this invention is to reduce the cost of producing hydrogen fuel by electrolysis. A third object of this invention is to produce and store hydrogen at the power plant to eliminate the cost of transporting hydrogen and the need to upgrade natural gas pipelines and pipeline compressors.

In a first aspect of the invention, an electric power plant comprises a combustion turbine generator that combusts hydrogen fuel, or a blend of hydrogen and natural gas to generate electricity and produce hot exhaust gases, a second heat source different from the combustion turbine, a thermal energy storage system that stores heat from the second heat source, a steam turbine generator that expands superheated steam across a steam turbine to generate electricity, a feedwater reservoir that stores feedwater condensed from steam exhausted from the steam turbine, a feedwater preheater configured to heat feedwater from the feedwater reservoir with heat exclusively from the combustion turbine exhaust gases, a boiler configured to boil feedwater from the feedwater preheater with heat exclusively from the thermal energy storage system to generate steam, a superheater configured to heat steam from the boiler exclusively with heat from the combustion turbine exhaust gases to generate the superheated steam, an electric powered electrolyzer to produce hydrogen fuel from steam, and optionally a compressor to compress hydrogen for storage prior to its use as fuel in the combustion turbine.

The electric power plant may also comprise a standby superheater connected in parallel with the superheater between the boiler and the steam turbine and configured to heat steam from the boiler using heat exclusively from the thermal energy storage system in order to operate the steam turbine generator to produce electricity, some or all of which may be consumed by the electrolyzer to produce Hydrogen.

The steam to the electrolyzer may for example be produced by the boiler, extracted from the steam turbine, or may bypass the steam turbine after being heated in the superheater or standby superheater.

In a second aspect of the invention, a method of operating the electric power plant of the first aspect of the invention comprises using electricity from the grid to power the second heat source to heat the storage and produce steam for the electrolyzer and as the electricity source for the electrolyzer The method may also comprise producing hydrogen from electricity generated by the steam turbine generator using steam produced from stored thermal energy.

In another aspect of the method, the electrolyzer may be operated at a reduced or minimum rate of hydrogen production, in order to avoid turning off the electrolyzer, while the combustion turbine is operated using stored hydrogen fuel.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 5 tabulates operating parameters for several example power generation systems comprising commercially available combustion turbines operated in a simple cycle or in a LSCC system as described herein.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. As used in this specification and the appended claims, the singular forms "a," "an," and "the" include plural referents unless the context clearly indicates otherwise.

This specification discloses apparatus, systems, and methods for start-up and operation of liquid salt energy storage combined cycle systems.

Figure 4:
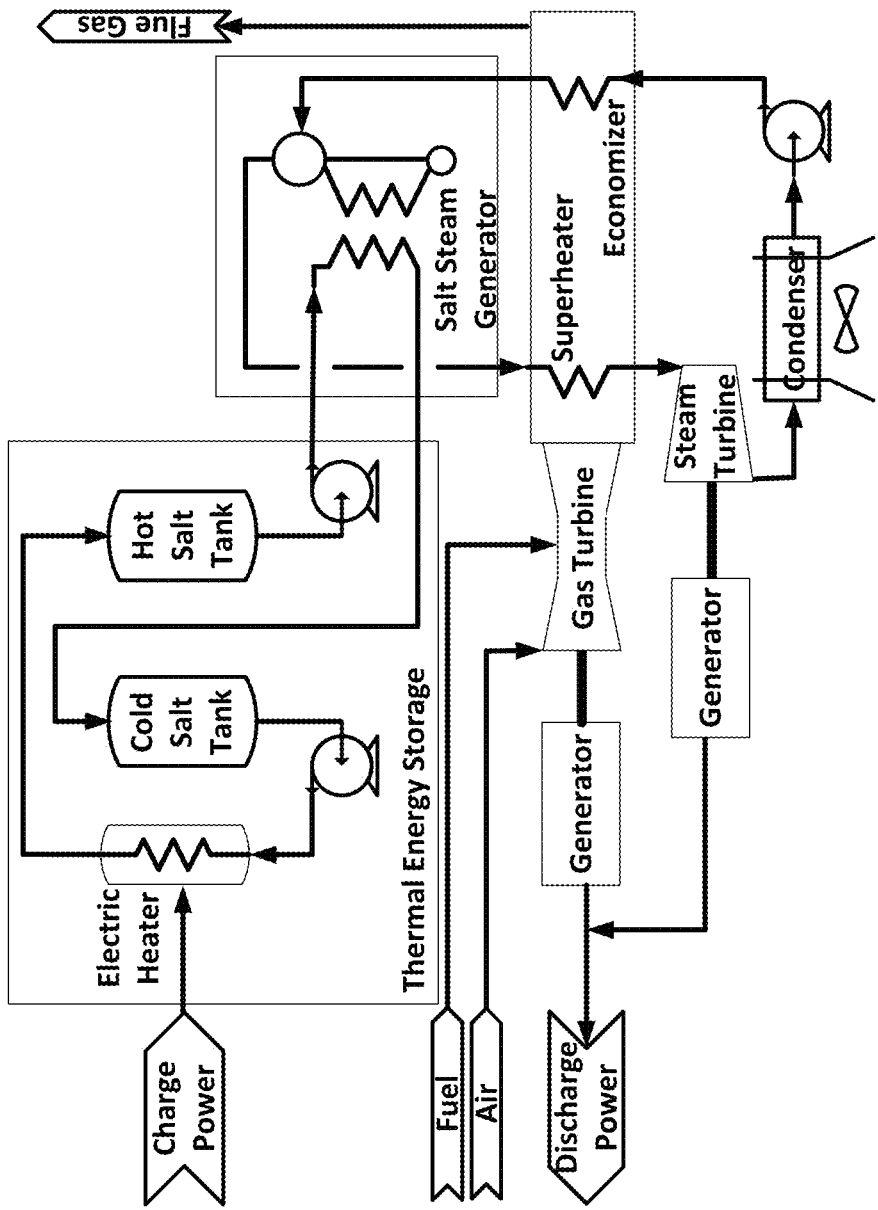
FIG. 4 schematically shows an example liquid salt energy storage combined cycle (LSCC) system.

The example liquid salt combined cycle (LSCC) system shown in FIG. 4 integrates thermal energy storage with gas and steam turbines in a novel system that enables faster start-up and improved plant fuel efficiency. By moving evaporative heating duty outside the exhaust heat recovery steam generator, this arrangement removes heat transfer constraints to increase steam turbine flow and power output without increasing combustion turbine fuel flow, resulting in exceptionally low fuel Heat Rate.

Steam is evaporated using energy stored in molten salt (or in another thermal storage medium), while the gas turbine exhaust is used to economize and then superheat the steam in a single pressure, non-reheat steam cycle. A single-pressure non-reheat LSCC allows much higher steam flow and steam turbine power than in a triple-pressure reheat combined cycle. Removing the high-pressure drum, and using stored energy for pre-heat, also facilitates fast start-up which is needed in markets with large penetration of variable renewable energy.

LSCC can be used with any gas turbine, including industrial, frame, and aero-derivatives, to boost output. The system improves the efficiency metrics for a hybrid energy storage plant: Fuel Heat Rate and Primary Energy Rate, which are the ratios of fuel and stored energy input per unit of electricity output from the overall system. As tabulated in FIG. 5, hybrid integration reduces both fuel heat rate and primary energy rate. The combustion turbine exhaust increases the efficiency of converting stored thermal energy to electricity, and the stored energy displaces fuel. This is an effective greenhouse gas (GHG) reduction strategy, reduces the cost of storing and time-shifting renewable power, and by reducing the fuel heat rate, makes it more economical to use expensive fuels, such as those produced with renewable energy.

Compared to parabolic trough or tower Concentrating Solar Power (CSP) plants, there is about an 80% reduction in the mass and volume of salt needed per MWh of electric energy delivered. About 12.5 kg of salt are used per kWh of electricity, as tabulated in FIG. 5. At a cost of $2000 per metric ton of salt, the cost of storage is about $25/kWh, or about 25% of the anticipated future cost for Lithium-ion battery packs. By using high temperature exhaust for superheating steam, molten salt can be stored at moderate temperatures compatible with carbon steel tanks and piping, to reduce cost compared to storage systems that use high temperature thermal storage without exhaust gas augmentation.

LSCC uses electric heaters with high electric to thermal efficiency to store low-cost or otherwise curtailed renewable energy. As loss rates are <1% per day, this energy can remain stored in the LSCC tank(s) for many days until needed. The salt is also non-toxic, non-flammable, and does not degrade with use, no matter how often the system is cycled, or how fast it is charged or discharged.

Electric heating provides charging flexibility that can rapidly add or drop load to compensate for variable wind and solar, and even provide frequency regulation using solid-state controls with sub-cycle response. Likewise, the LSCC generator could provide voltage regulation as a synchronous condenser by inserting a clutch on the steam turbine shaft.

The LSCC system has three primary operating modes: charging, standby, and discharging.

The charging operating mode occurs when demand for electric power and its cost is low, using electricity as the primary energy source to heat the storage system. Molten salt is pumped from a cold salt storage tank through an (e.g., electric) heater and then into the Hot Tank. Other forms of heating could be used, including heat pumps, heating by solar thermal energy, indirect heating using a heat transfer medium or heat from another process, such as exhaust from a powerplant, steel or glass mill, etc. Typically, charging would occur during periods of abundant or excess renewable energy production, so the combustion turbine would not need to operate. However, during unusual events such as grid outages, or when renewable power is unavailable due to weather or fires, the combustion turbine could be a charging source, using both electricity and exhaust heat.

The standby operating mode occurs when primary energy is neither stored nor discharged by the system. During standby, heat losses to the environment will reduce the temperature of molten salt in the storage tanks and piping, and the temperature of the working fluid and piping in the bottoming power cycle. During standby, the heat losses from insulated molten salt storage tanks are typically less than 1% per day, which might correspond to about 1° C. per day.

The discharge operating mode occurs when primary energy (electricity) is produced by the system using a combination of fuel and stored energy. The combustion turbine produces power from fuel and the steam turbine produces power from heat from the molten salt tank and from the combustion turbine exhaust gas.

Figure 6:
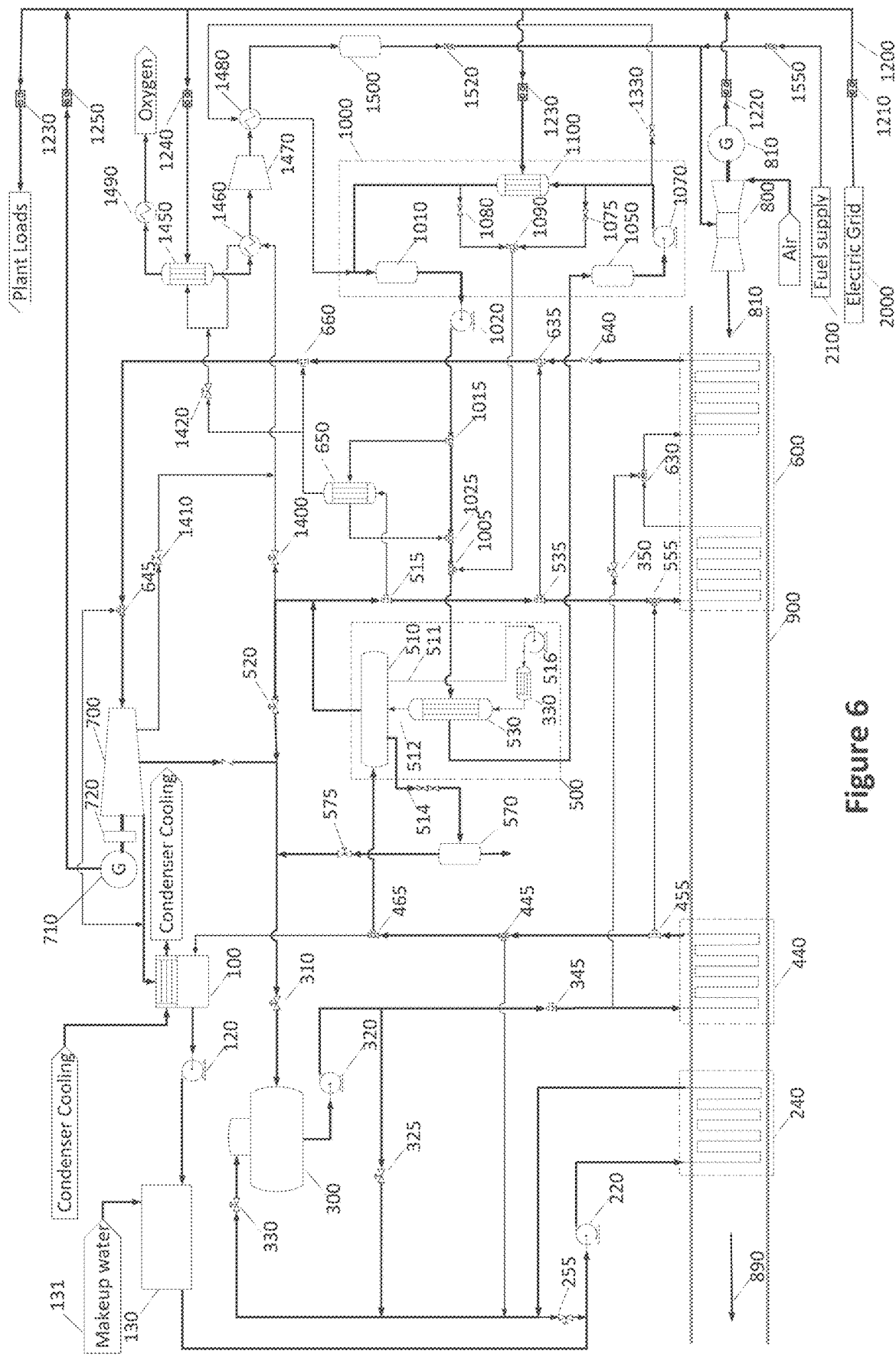
FIG. 6 shows a Hydrogen Fueled Electric Power Plant with thermal energy storage in which an electrolyzer is integrated with the LSCC system of FIG. 4.

The example LSCC system illustrated in FIG. 6 shows a steam Rankine Bottoming Cycle receiving energy from combustion turbine exhaust and from hot molten salt, extracting energy in the turbine and rejecting energy to the environment by condenser cooling. The LSCC aspect of the invention is described with reference to a particular combustion turbine, the General Electric LM6000PC SPRINT, with an air-cooled condenser for the steam cycle. Other combustion turbines could be readily substituted and alternate means of rejecting waste heat from the steam cycle could be provided, such as once-through water cooling or evaporative cooling towers. Likewise, the molten salt storage tanks, pumps, and heaters could be replaced with any suitable means of storing thermal energy. Different pressures and temperatures may be selected as design conditions or may result from operation at off-design conditions due to variation of ambient conditions or equipment degradation, or from the selection of a different combustion turbine or condenser cooling system. A bottoming cycle could also use multiple boilers, each operating at different pressures, and heated by stored thermal energy. A bottoming cycle could also use a reheat heat exchanger to warm steam extracted from a steam turbine at intermediate pressure using stored energy.

During normal operation at full power, exhaust gas from combustion turbine 800 is sent through a Heat Recovery System comprising a superheater 600, economizer 440, and condensate heater 240 which cool the exhaust gas by heat transfer before the exhaust gas is discharged to the atmosphere. The exhaust gas path may also include a bypass damper, not shown in FIG. 6, to direct some or all of the exhaust directly to the atmosphere, without passing through the Heat Recovery System. There may also be emissions control equipment (not shown in FIG. 6) disposed at suitable locations within the exhaust gas Heat Recovery System. In an embodiment employing an LM6000 combustion turbine, exhaust gas is delivered to the upstream side of superheater 600 at a temperature of approximately 450° C. and after passing through the Heat Recovery System is discharged to the atmosphere at about 70° C. Different combustion turbines would have different exhaust temperatures.

In addition to the exhaust heat provided by the combustion turbine 800, the steam Rankine Cycle is heated by molten salt heat transfer fluid from a Thermal Energy Storage System 1000 comprising one or more Hot Salt Storage Tanks 1010 and Cold Salt Storage Tanks 1050 each with an associated Hot Salt Pump 1020 and Cold Salt Pump 1070. In this embodiment, hot molten salt is stored at a temperature of approximately 425° C., but higher or lower temperatures could also be used, as could alternative heat transfer fluids. The molten salt enters Molten Salt Steam Generator 500 to transfer heat and boil water at approximately 42 bar pressure. The salt is cooled by heat transfer and is returned to Cold Salt Storage Tank 1050 at a temperature of approximately 258° C. Molten Salt Steam Generator 500 may be a recirculating boiler with Steam Drum 510 and Salt Heat Exchanger 530 or may be a once-through boiler without Steam Drum 510. For the recirculating boiler, water from Steam Drum 510 flows through line 511 to Salt Heat Exchanger 530 where heat transfer evaporates some of the water, with a two-phase (steam/water) mixture returning via line 512 to Steam Drum 510, which separates the liquid and vapor phases, with the vapor phase (steam) being discharged from Steam Drum 510 via line 513. Water may flow through line 511 via natural circulation or by means of recirculation pump 516. The accumulation of dissolved solids in Steam Drum 510 may be reduced by liquid blow down through line 514 to Blowdown Tank 570. A Startup Feedwater Heater 330 may be interposed between the Steam Drum 510 and Salt Heat Exchanger 530 to heat circulating water above the freezing point of the salt.

In this embodiment, a three-component eutectic salt mixture may be used (53% potassium nitrate, 7% sodium nitrate, and 40% sodium nitrite), commonly known the by tradename Hitec Heat Transfer Salt. This salt has a low melting point (142° C.) and is compatible with plain carbon steel at temperatures up to 454° C. In contrast, the two-component eutectic salt mixture (60% Sodium Nitrate with 40% Potassium Nitrate) commonly known as solar salt as used in Concentrated Solar Power applications has a freezing point of 238° C. It is desirable to use the lower freezing point mixture to reduce or eliminate the risk of solidification of salt in Molten Salt Steam Generator 500.

The molten salt heat transfer fluid may also be used as the thermal energy storage medium in the two-tank system comprising a Hot Salt Storage Tank 1010 and cold salt storage tank 1050. Thermal energy could also be stored in a single tank with a thermocline layer between regions of hot and cold salt. A molten salt tank may also be partially filled with low-cost solid thermal storage media in order to displace the volume of molten salt and reduce the cost of storage. Molten salt could also be used as the heat transfer fluid to move heat into and out of solid media thermal storage.

At standard ambient conditions (15° C., sea level atmospheric pressure, 60% relative humidity) the LM6000 produces about 49,995 kW of electric power at full load while consuming 124,600 kW of fuel. In this embodiment at a steam condensing pressure of 0.076 bar, the Steam Turbine Generator 700 produces 43,921 kW of electric power, using a combination of exhaust heat from combustion turbine 800 and 83,120 kW of stored energy input via the molten salt.

The Rankine Cycle operates in a circuit, which is now described starting at the Condenser 100, which condenses steam at a temperature of about 35° C. Condensate Pump 120 draws about 44.8 kg/s of condensate from the hot-well of Condenser 100 and pumps the water through an optional condensate polishing system 130. About 0.36 kg/s of makeup water is added by Makeup Water System 131 to compensate for blowdown and other losses, so about 44.8 kg/s of water flows to the Low Pressure Circulating Pump 220. To avoid condensation of water of combustion on the exhaust gas side of the Condensate Heater 240, heated water is recirculated to the inlet of the Low Pressure Circulating Pump 220. About 9.3 kg/s of heated water at a temperature of about 124° C. is mixed with the condensate and makeup water to raise the temperature to about 55° C. This 55° C. water mixture is pumped through the condensate heater 240 to be heated to a temperature of about 124° C. by exhaust gas. Temperature Control Valve 255 adjusts the fraction of heated water that is recirculated to warm the mixture of condensate and makeup water.

About 44.8 kg/s of heated water flows to the deaerator 300, where it is further heated by 1.66 kg/s of steam at a pressure of 4.25 bar. This "pegging" steam is a combination of extraction steam extracted the steam turbine 700 and flash steam from the blowdown tank 570. The steam flowing to the deaerator is regulated by Pressure Control Valve 310 to maintain the deaerator pressure at 4 bar which corresponds to a saturation temperature of 143.6° C. Gases are largely insoluble at this temperature and are vented from the deaerator along with a small amount of steam. Customary chemicals may be injected into the deaerator 300 to scavenge oxygen, and to reduce corrosion throughout the Rankine Cycle.

About 46.5 kg/s of deaerated water is then pressurized to about 44 bar by Feedwater Pump 320 and flows to Economizer 440 to be heated by exhaust gas to a temperature of about 233° C. (about 20° C. below the saturation temperature at 44 bar).

The economized feedwater then enters the Molten Salt Steam Generator (MSSG) 500 to be evaporated using heat transferred from hot molten salt. MS SG 500 may be any suitable type of boiler, including Once-Through, recirculating drum, or kettle. In the case of recirculating and kettle type boilers, there will be need for blowdown to remove accumulated dissolved solids. Once-through type boilers would require feedwater treatment that removes dissolved solids from the circulating water. In this embodiment, about 0.36 kg/s of saturated liquid is extracted as blowdown from MSSG 500, flows to the Flash Tank 570, which is maintained at a pressure of about 4.25 bar by pressure control valve 575. Steam that flashes as result of the pressure reduction is directed to the Deaerator 300, and liquid is directed to a drain cooler, not shown, and then disposed or treated.

To heat the feedwater to saturation temperature and boil the approximately 46 kg/s of water remaining after blowdown, approximately 319 kg/s of molten salt at a temperature of 425° C. enters MSSG 500 to produce saturated steam at a pressure of 42 bar. The salt leaves the MSSG 500 at about 258° C. and returns to the Cold Salt Storage Tank 1050. The pressure within MS SG 500 is controlled by varying the flow rate of salt into MS SG 500. Variation of the entering salt temperature due to heat loss from thermal energy storage system 1000 may be compensated by increasing or decreasing the salt flow rate, which may be accomplished by varying the hot salt pump 1020 speed or by adjusting flow control valves. For example, at 420° C. hot salt temperature, the salt flow rate would increase to about 329 kg/s.

Steam flows from MSSG 500 to superheater 600 to be heated by exhaust gas to a temperature of about 425° C. and then flows to the steam turbine 700 to produce power. A fraction of the steam is extracted from steam turbine 700 at a pressure of about 4.25 bar to heat water in Deaerator 300 as previously described. After producing power, low-pressure steam at about 84 millibar exits steam turbine 700, with about 12% moisture content. The wet steam is then cooled in condenser 100 and drained into the hotwell, completing the Rankine steam cycle circuit.

During the discharge operating mode, the LSCC system operates to deliver electric power to the electric grid 2000 using fuel for combustion turbine 800 and stored energy to evaporate water in MSSG 500. Power from the combustion turbine's generator 810 flows through circuit breaker 1220 and optional transformer (not shown) to the electric grid 2000 via circuit breaker 1210. Power from the steam turbine's generator 810 flows through circuit breaker 1250 and optional transformer (not shown) to the electric grid 2000 via circuit breaker 1210. Power for motors and other plant loads are drawn through circuit breaker 1260. Transformers, protective, and control devices, not shown in FIG. 6, would be customarily included. When there is insufficient energy in storage or when the electrical price is too low to economically discharge energy from storage, the discharge operating mode is terminated and circuit breakers 1220 and 1250 are opened.

During standby mode, the price of electricity is too low to justify the consumption of fuel to produce power, but not low enough to justify storing energy in salt by purchasing energy from the electric grid 2000, other than to supply power to the plant for operation of pumps, lighting, auxiliary systems etc. via circuit breaker 1260. It may be desirable to keep the steam cycle warm and ready to return to discharge operating mode by circulating salt through steam generator 500 to produce Steam, some of which may flow to Deaerator 300, or be used to maintain vacuum in condenser 100, or to rotate the steam turbine 700.

Figure 1:
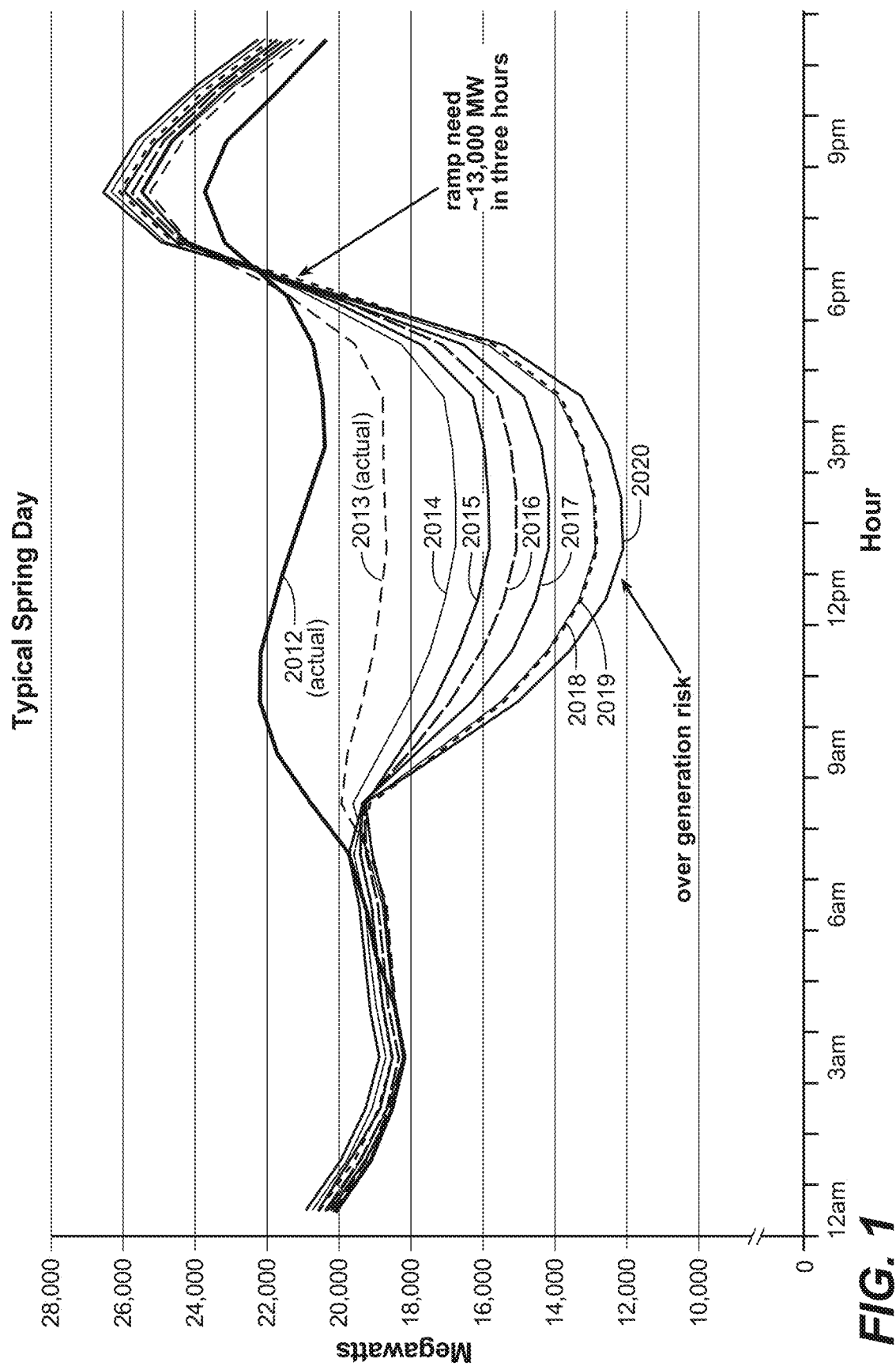
FIG. 1 shows plots of the California Independent System Operator Net Load as a function of time of day—the "Duck" curve—on 31 March as renewable generation percentage increases annually.
Figure 2:
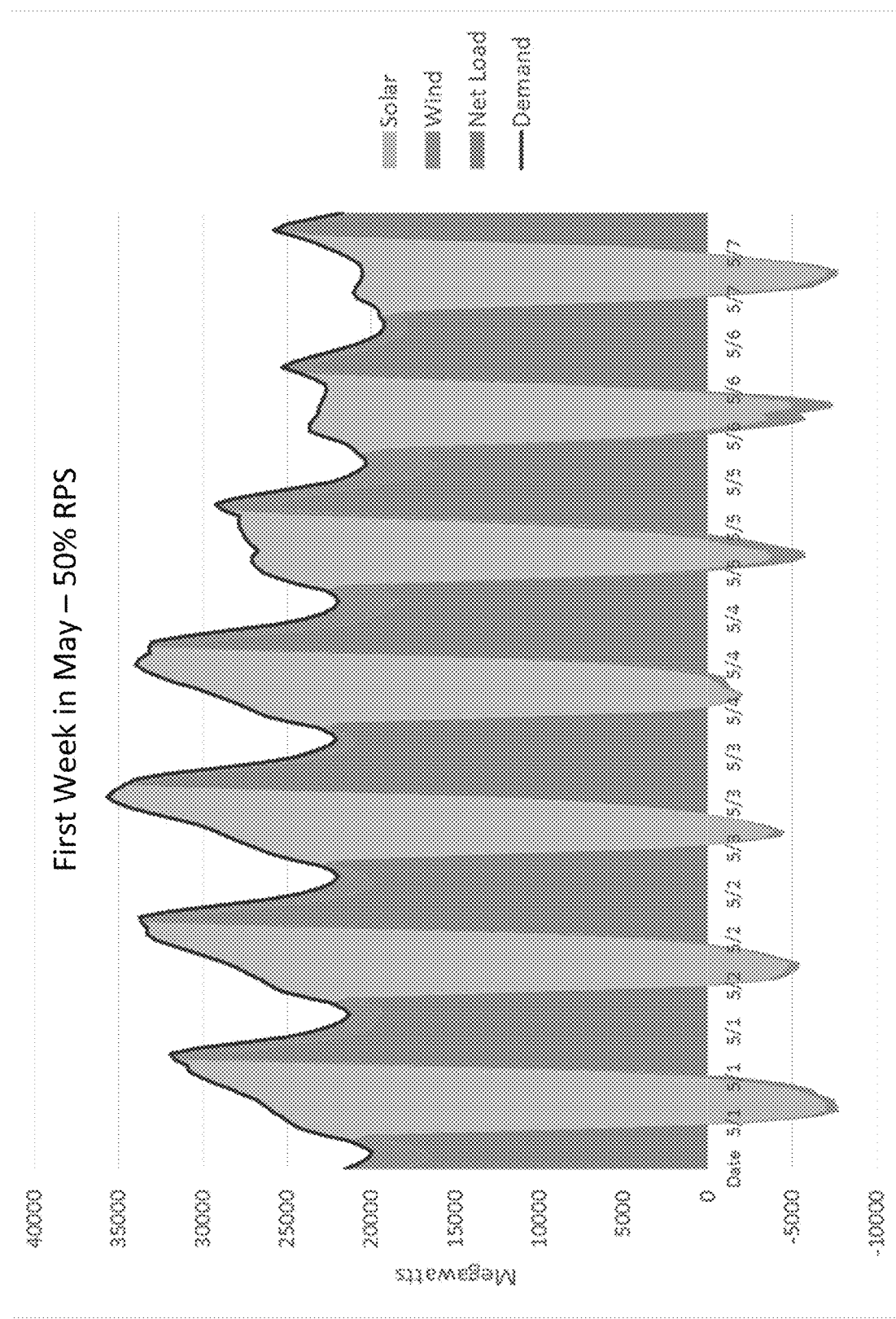
FIG. 2 shows a projection of the California Independent System Operator Net Load for a week in May under a hypothetical 50% renewable fraction.
Figure 3:
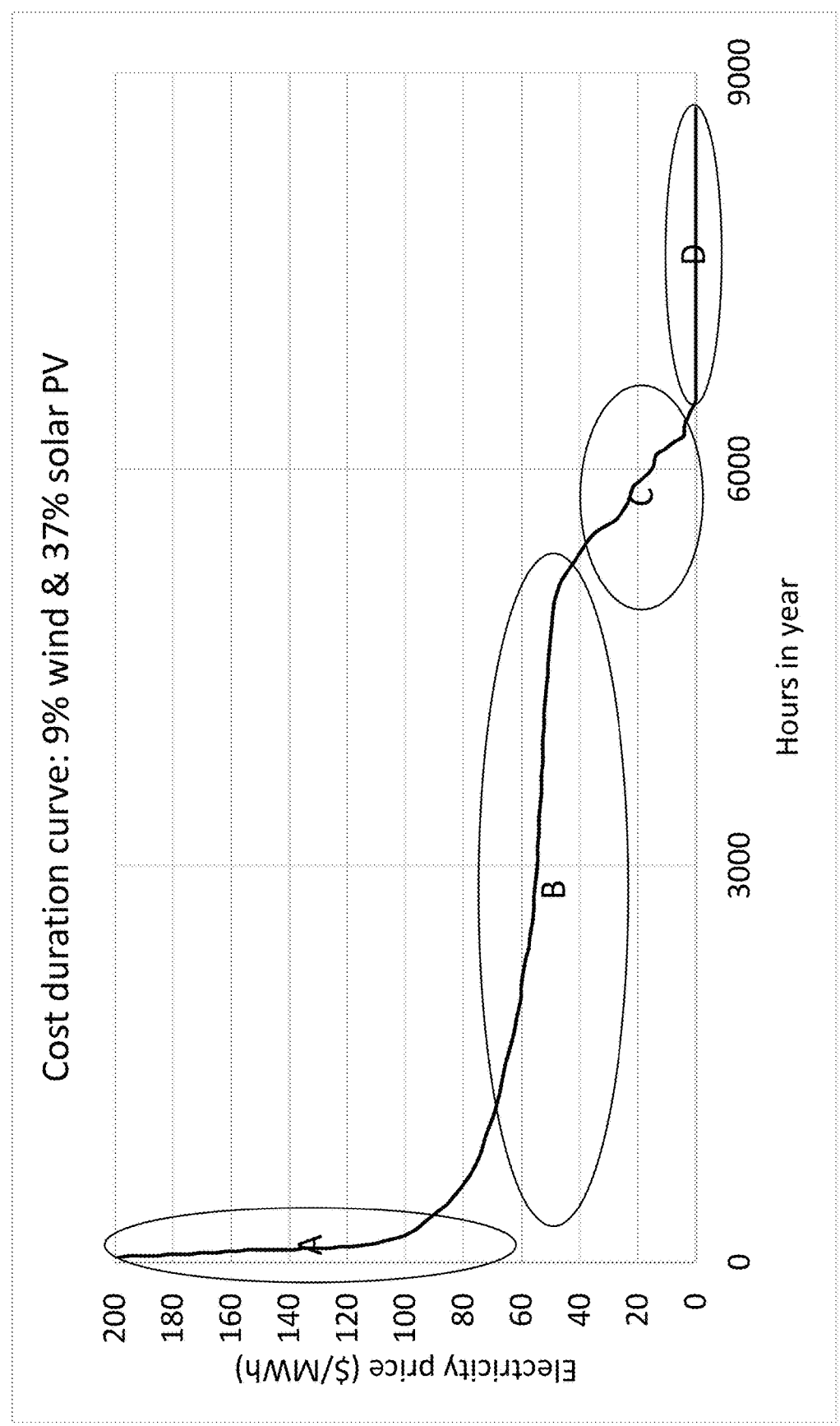
FIG. 3 shows a cost-duration curve that plots the cost of electricity for each hour of the year, ordered from high to low cost, for a hypothetic system with wind and solar renewable fractions.

When electric prices are sufficiently low, such as depicted in Region D of FIG. 3, the system enters charging mode, whereby salt is circulated by cold salt pump 1070 from cold storage tank 1070 through charging heater 1100 to be heated by power from electric grid 2000 via circuit breaker 1230. Heated salt then flows to Hot Storage Tank 1010, accumulating stored energy.

During discharge operating mode, liquid or gaseous fuel may be delivered from a fuel supply 2100. The fuel supply could be natural gas from a pipeline, or liquefied natural gas stored at the plant that has been re-gasified for use, or could be a distillate such as jet fuel or diesel fuel, or any other suitable fuel. For the LM6000 example, and assuming pure methane as the fuel with a Lower Heating Value of 50 MJ/kg approximately 2.492 kg/s of would be consumed, resulting in approximately 6.89 kg/s of $CO_2$ in the exhaust gas 810. As a 'simple cycle' power plant, the gas turbine generates 49,995 kW corresponding to an emissions rate of 0.50 kg/kWh, whereas the LSCC plant with net power output of 91,991 kW emits about 0.27 kg/kWh.

$CO_2$ emissions could be eliminated by using pure hydrogen with a Lower Heating Value of 120 MJ/kg as the fuel at a flow rate of 1.039 kg/s. Blending hydrogen with natural gas would result in intermediate emissions reductions.

Pipeline transportation of hydrogen from remote sources may require that pipelines be upgraded to avoid hydrogen embrittlement, and that pipeline compressors be modified to accommodate the differences in density and sonic velocity of hydrogen compared to natural gas. Hydrogen transport can also be expensive because of higher compression work and the need for larger pipeline diameter to transfer the same quantity of energy when transporting hydrogen.

Hydrogen can be produced from natural gas by steam methane reforming with carbon capture, referred to as 'Blue' Hydrogen. An alternative is to produce 'Green' hydrogen by electrolysis of water using zero-carbon electricity. Industrial hydrogen production has traditionally used alkaline electrolysis, although Proton Exchange Membrane (PEM) technology is increasingly preferred. High temperature electrolysis (HTE) via solid oxide electrolysis cell (SOEC) has cost and efficiency advantages over other Proton Exchange Membrane and Alkaline electrolysis. The SOEC operates at temperatures of 600° C. to 850° C. where the thermodynamics and kinetics for splitting the water molecule are more favorable. Steam is the feedstock to the SOEC, which uses electricity to further raise the temperature and dissociate water molecules into the constituents of Hydrogen and Oxygen.

Green Hydrogen could be produced at the power plant, to eliminate the challenge of transporting hydrogen through pipelines, but is an expensive fuel compared to natural gas or liquefied natural gas. Integration of hydrogen electrolysis with an LSCC system is advantageous as LSCC reduces the amount of fuel consumed per unit of electricity delivered during discharge, which reduces the size and cost of electrolyzers as well. Referring again to FIG. 6, the integration of hydrogen electrolysis with LSCC is now described.

During the charging operating mode, when electricity from the electric grid 2000 is relatively inexpensive, circuit breaker 1240 is closed to provide power to SOEC 1450 and steam is supplied to SOEC 1450 from Molten Salt Steam Generator 500 via valve 1400. Hot molten salt to produce steam is delivered from Charging Heater 1100 via valves 1080, 1090, and 1005, and returns to cold storage tank 1050. Hydrogen produced in the SOEC 1450 is cooled by Precooler 1460, pressurized by Compressor 1470 and cooled by After Cooler 1480 for storage in Hydrogen Storage Tank 1500. Multiple stages of compression may be used in order to pressurize hydrogen sufficiently, with intercoolers between the stages.

Saturated steam from Molten Salt Steam Generator 500 may be superheated by heat transfer from the hydrogen effluent of SOEC 1450 in Precooler 1460 as shown, by heat transfer from the Oxygen effluent from SOEC 1450 in Oxygen Cooler 1490 (not shown), and/or by heat transfer from the pressurized hydrogen discharged from Compressor 1470 in After Cooler 1480. Additional cooling of the hydrogen and oxygen streams below the temperature of the saturated steam from Molten Salt Steam Generator 500 may be provided as convenient or necessary.

In some embodiments, the hydrogen and oxygen streams may be used to heat molten salt (or other thermal heat transfer fluids) transferred via valve 1330 through one or more of heat exchangers 1460, 1480 as shown, or 1490. Heated salt would be returned to the Hot Salt Storage Tank 1010.

Electricity for hydrogen electrolysis in SOEC 1450 can be produced from stored energy using the steam turbine 700 to make power in its generator 710 and delivering power to SOEC 1450 through circuit breakers 1250 and 1240.

Motive power to drive Compressor 1470 can be provided by an electric motor (not shown) powered as a Plant Load through Circuit Breaker 1230 or by steam power, using a dedicated steam turbine, or by a power take-off from Gearbox 720 on the shaft of steam turbine 700.

The efficiency of converting stored energy to electricity can be increased by raising the pressure of steam flowing to steam turbine 700, which necessitates the use of superheated steam to avoid excessive moisture in the low-pressure section of steam turbine 700. Before entering Molten Salt Steam Generator 500, salt from Hot Salt Pump 1020 flows through valve 1015 to heat steam entering optional standby superheater 650 via valve 515, with superheated steam continuing through valve 660 to the steam turbine 700. The salt continues to the Molten Salt Steam Generator 500 via valve 1025.

Depending on the steam pressure and temperature required by SOEC 1450, steam could be delivered as saturated steam from Molten Salt Steam Generator 500 via valve 1400, could be delivered as superheated steam using standby superheater 650 via valve 1420, or could be delivered at an intermediate pressure and temperature by extracting steam from steam turbine 700 via valve 1410, to be superheated using one or more of the heat exchangers 1460, 1480, and 1490. Salt is stored in the Hot Tank above the critical temperature of water (374° C.) so it is feasible to deliver supercritical steam to SOEC 1450. Operation of SOEC 1450 at higher pressure and temperature may improve electrolysis efficiency and could permit elimination of the compressor 1470 and associated coolers or permit a lower pressure ratio to reduce compression work. A high pressure pump could deliver demineralized feedwater to a supercritical boiler heated by hot molten salt, similar to the arrangement described for the standby superheater 650 to enable Hydrogen production and storage at >200 bar.

The production rate of Hydrogen by SOEC 1450 can be controlled by adjusting the flow rates of steam and electricity, while maintaining the pressure and temperature approximately constant. By reducing the electric power and steam flow to the minimum, the SOEC 1450 could be operated during discharge mode, maintaining its temperature, and avoiding temperature cycling, and the time lag and energy cost associated with startup of the SOEC. Likewise, production of hydrogen during charging or standby operating modes requires steam generation, which avoids shutdown and cycle of the steam cycle.

The present invention provides methods and means for decreasing the operating and capital cost components of hydrogen fuel production from renewable resources by the combination of SOEC with LSCC and has numerous benefits: low fuel heat rate reduces the amount of hydrogen to be produced and accordingly the size and cost of electrolysis equipment. LSCC already includes steam generation to feed the SOEC, avoiding duplication of equipment and costs; thermal cycling of both the LSCC steam generation equipment and the SOEC can be reduced or eliminated by coordinating the operation of SOEC with the LSCC charging and discharging operations; the cost of pipelines and transportation of hydrogen can be eliminated by on-site production the production cost of hydrogen can be reduced by using low-cost stored energy from the electric grid to power the electrolyzer.

This disclosure is illustrative and not limiting. Further modifications will be apparent to one skilled in the art in light of this disclosure and are intended to fall within the scope of the appended claims.

What is claimed is:

1. A combined cycle power plant comprising:
    a combustion turbine generator that combusts a fuel comprising hydrogen gas to generate electricity and produce hot exhaust gases;
    a second heat source, different from the combustion turbine;
    a thermal energy storage system that stores heat from the second heat source;
    a steam turbine generator that expands superheated steam across a steam turbine to generate electricity;
    a feedwater reservoir that stores feedwater condensed from steam exhausted from the steam turbine;
    a feedwater preheater configured to heat feedwater from the feedwater reservoir with heat exclusively from the combustion turbine exhaust gases;
    a boiler configured to boil feedwater from the feedwater preheater with heat exclusively from the thermal energy storage system to produce steam;
    a superheater configured to heat steam produced in the boiler exclusively with heat from the combustion turbine exhaust gases to produce the superheated steam; and an electrically powered electrolyzer configured to electrolyze steam produced in the boiler to produce the hydrogen gas;

wherein the electrolyzer is fluidly coupled to the steam turbine and configured to electrolyze steam produced in the boiler, superheated in the superheater, and extracted partially expanded from the steam turbine generator to produce the hydrogen gas.

2. The combined cycle power plant of claim 1, wherein the fuel consists essentially of the hydrogen gas.

3. The combined cycle power plant of claim 1, wherein the fuel comprises methane mixed with the hydrogen gas.

4. The combined cycle power plant of claim 1, comprising:
a compressor configured to compress the hydrogen gas produced in the electrolyzer; and
a hydrogen storage tank configured to store hydrogen gas compressed by the compressor for subsequent combustion in the combustion turbine generator.

5. The combined cycle power plant of claim 1, wherein the electrolyzer is electrically connected to be powered by electricity generated by the steam turbine generator.

6. The combined cycle power plant of claim 1, wherein the electrolyzer is or comprises a solid oxide electrolyzer.

7. The combined cycle power plant of claim 1, wherein the second heat source is an electrically powered heater.

8. The combined cycle power plant of claim 1, wherein the thermal energy storage system comprises a molten salt.

9. A combined cycle power plant comprising:
a combustion turbine generator that combusts a fuel comprising hydrogen gas to generate electricity and produce hot exhaust gases;
a second heat source, different from the combustion turbine;
a thermal energy storage system that stores heat from the second heat source;
a steam turbine generator that expands superheated steam across a steam turbine to generate electricity:
a feedwater reservoir that stores feedwater condensed from steam exhausted from the steam turbine;
a feedwater preheater configured to heat feedwater from the feedwater reservoir with heat exclusively from the combustion turbine exhaust gases;
a boiler configured to boil feedwater from the feedwater preheater with heat exclusively from the thermal energy storage system to produce steam;
a superheater configured to heat steam produced in the boiler exclusively with heat from the combustion turbine exhaust gases to produce the superheated steam;
an electrically powered electrolyzer configured to electrolyze steam produced in the boiler to produce the hydrogen gas; and
a second superheater connected in parallel with the superheater between the boiler and the steam turbine and configured to heat steam from the boiler using heat exclusively from the thermal energy storage system to produce additional superheated steam.

10. The combined cycle power plant of claim 9, wherein the electrolyzer is fluidly coupled to the second superheater and configured to electrolyze steam produced in the boiler, heated in the second superheater, and bypassing the steam turbine generator to produce the hydrogen gas.

11. The combined cycle power plant of claim 9, wherein the electrolyzer is fluidly coupled to the second superheater and configured to electrolyze steam produced in the second superheater using heat exclusively from the thermal energy storage system to produce the hydrogen gas.

12. The combined cycle power plant of claim 9, wherein:
the second heat source is an electrically powered heater; and
the thermal energy storage system comprises a molten salt.

13. The combined cycle power plant of claim 12 wherein the electrolyzer is fluidly coupled to the second superheater.

14. The combined cycle power plant of claim 9, wherein the fuel consists essentially of the hydrogen gas.

15. The combined cycle power plant of claim 9, wherein the fuel comprises methane mixed with the hydrogen gas.

16. The combined cycle power plant of claim 9, comprising:
a compressor configured to compress the hydrogen gas produced in the electrolyzer; and
a hydrogen storage tank configured to store hydrogen gas compressed by the compressor for subsequent combustion in the combustion turbine generator.

17. The combined cycle power plant of claim 9, wherein the electrolyzer is electrically connected to be powered by electricity generated by the steam turbine generator.

18. The combined cycle power plant of claim 9, wherein the electrolyzer is or comprises a solid oxide electrolyzer.

19. The combined cycle power plant of claim 9, wherein the second heat source is an electrically powered heater.

20. The combined cycle power plant of claim 9, wherein the thermal energy storage system comprises a molten salt.

* * * * *